United States Patent [19]

Yang

[11] Patent Number: 5,126,416

[45] Date of Patent: Jun. 30, 1992

[54] PEROXY CURED (METH)ACRYLIC ESTER COMPOSITIONS EMPLOYING NITRITE, BORATE, SILICATE OR CARBONATE SALT ACCELERATORS

[75] Inventor: Darchun B. Yang, West Hartford, Conn.

[73] Assignee: Loctite Corporation, Hartford, Conn.

[21] Appl. No.: 498,842

[22] Filed: Mar. 26, 1990

[51] Int. Cl.$^5$ ................................................ C08F 2/00
[52] U.S. Cl. ........................................ 526/89; 156/64; 156/307.3; 156/319; 156/332; 427/333; 427/341; 526/195; 526/227; 526/236
[58] Field of Search ................ 156/319, 332, 307.3, 156/64; 427/333, 341; 526/89, 227, 195, 236

[56] References Cited

U.S. PATENT DOCUMENTS

| | | | |
|---|---|---|---|
| 3,691,080 | 9/1972 | Bauer et al. | 526/236 |
| 4,731,146 | 3/1988 | Clark | 156/319 |
| 4,933,213 | 6/1990 | Fourquier et al. | 427/333 |

*Primary Examiner*—John J. Gallagher
*Attorney, Agent, or Firm*—Vidas & Arrett

[57] ABSTRACT

(Meth)acrylic ester formulations employing peroxy initiators have accelerated cure rates when the substrates to which they are applied, or the compositions themselves, include nitrite, borate, silicate or carbonate salts. The compositions should be free of acids having a PKa of 6 or less unless the composition also includes a transition metal compound.

11 Claims, No Drawings

PEROXY CURED (METH)ACRYLIC ESTER COMPOSITIONS EMPLOYING NITRITE, BORATE, SILICATE OR CARBONATE SALT ACCELERATORS

BACKGROUND OF THE INVENTION (Anaerobic formulations, i.e. (meth)acrylic ester formulations which are oxygen stabilized and cure as a result of oxygen deprivation,) have become well known since their disclosure in U.S. Pat. No. 2,628,178. The invention of formulations employing hydroperoxide catalysts which are stable without aeration which was disclosed in U.S. Pat. No. 2,895,950 (Krieble) prompted a wide range of commercial uses for such formulations including thread locking, impregnation of porous articles, gasketing and adhesive bonding applications. Acceleration of the cure of such composition has been disclosed in numerous patents. (Sulfimide accelerators, particularly saccharin (benzoic sulfimide),) have been used in most anaerobic formulations since the disclosure of their utility in U.S. Pat. No. 3,046,262. Other accelerator systems which are known for use in anaerobic formulations include various amine compounds as disclosed, for instance, in U.S. Pat. Nos. 3,041,322, 3,203,941 and 3,218,305 and various compounds having structures analogous to sulfimides such as disclosed in U.S. Pat. No. 4,513,127 and U.S. Pat. No. 4,622,348 and the references disclosed therein. Certain acyl hydrazine compounds are disclosed as anaerobic accelerators in U.S. Pat. Nos. 4,180,640 and 4,287,330preferably in combination with an acid having a small pKa of 6 or less. The various known types of accelerators are often used in combination in commercial formulations.

Similar acrylic curable peroxy initiated compositions which rely on chemical activation rather than oxygen deprivation to activate cure initiation are disclosed, for instance, in U.S. Pat. Nos. 4,442,267; 4,450,030; 4,451,615 and 4,574,142. Preferred activators for such compositions are amine/aldehyde condensation products.

Formulations employing combinations of anaerobic and chemical activation are also known. For instance, in U.S. Pat. No. 3,672,942 there is described an impregnation process employing the steps of impregnating a porous article with an anaerobically curable composition and then treating the surface with a chemical activator to induce surface cure where the impregnant is exposed to oxygen. Suitable activators include solutions of amine/aldehyde condensation products, various metal salts or chelates and various thiourea or other sulfur containing compounds. While the presence of uncured surface monomer has been reduced by the improved processes of U.S. Pat. No. 3,969,552 and U.S. Pat. No. 4,165,400, it is still generally advised to use an accelerator rinse to activate cure of the composition nearest of the surface of the impregnated article. Erythrobic or ascorbic acids have become preferred impregnation surface activators in more recent years.

It has also (long been known) that transition metals, especially copper or iron, play an important part in the cure mechanism of peroxide initiated acrylic formulations. This is especially so in anaerobic cure mechanisms. Transition metal oxidation is often part of the redox reaction which produces free radicals from peroxy initiators. Transition metal may be supplied by the substrate itself or in the form of salts of metals incorporated into the formulation or applied to the substrate. Copper, manganese, iron, cobalt and vanadium salts are all known for this purpose. copper and iron being the most commonly used. In impregnation processes which employ aeration of the acrylic monomer formulation it is typical to add 1-10 ppm copper as a copper salt directly to the formulation. As disclosed in U.S. Pat. No. 4,632,945, combinations of copper and iron salts or complexes may also be employed.

Recently it has been discovered that certain anaerobic formulations as described in U.S. Pat. Nos. 4,180,640 and 4,287,330 will not readily cure on metal substrates treated with nitrite, silicate, borate or alkaline carbonate corrosion inhibitors even though these compounds are typically present on the surface at a level of only a few ppm. Cure inhibition by nitrite salts was observed to be most severe. This discovery prompted an investigation of the effect of such salts on the cure of anaerobic compositions.

SUMMARY OF THE INVENTION

The investigation into curing inhibition by common corrosion inhibiting compounds has lead to the surprising discovery that in many cases these same compounds actually accelerate cure of peroxy initiated (meth)acrylic ester compositions. Accordingly, in one aspect this invention comprises a novel curable composition comprising:

(a) at least one (meth)acrylic ester;
(b) a polymerization initiating effective amount of a peroxy compound; and
(c) an effective amount for accelerating polymerization of a nitrite, borate, silicate or alkaline carbonate salt, provided that if the composition includes an acid having a pKa of 6 or less, the composition further includes at least 1 ppm of a transition metal salt and is free of compounds of the formula:

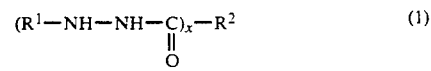

where $R^1$ is a monovalent hydrocarbon group, x is an integer of at least 1 and $R^2$ is H or a x-valent hydrocarbon group. Subject to the restrictions above, the composition may also include other conventional accelerators such as sulfimide, phenyl hydrazide and amine accelerators.

The cure accelerating nitrite, borate, silicate or alkaline carbonate salt may be applied to a substrate surface, rather than directly into the composition and still give effective acceleration. In this way the salts can be used both as corrosion inhibitors for the substrates and as cure accelerators for the composition. Therefore, as a further aspect of the invention there is the process of bonding or sealing two metallic substrates, at least one of which has a coating comprising a nitrite, borate, silicate or alkaline carbonate salt, the process comprising applying to at least one of said substrates composition comprising:

(a) at least one (meth)acrylic ester; and,
(b) a polymerization initiating effective amount of a peroxy compound provided that if the composition includes an acid having a pKa of 6 or less, the composition further includes at least 1 ppm of a transition metal salt and is free of compounds of the formula:

$$(R^1-NH-NH-\underset{\underset{O}{\|}}{C})_x-R^2 \quad (1)$$

where $R^1$ is a monovalent hydrocarbon group, x is an integer of at least 1 and $R^2$ is H or a x-valent hydrocarbon group,
and then joining the substrates until the composition has cured. The nitrite, borate, silicate or carbonate salt only need be present on the surface of the substrate in very low levels, such as a few ppm, to be effective.

A further aspect of the invention as described is its adaptability for impregnation into a porous substrate.

Surface acceleration with nitrite, borate, silicate or carbonate salt is also an advantage as a final step in an impregnation process using anaerobic sealants. Using a dilute aqueous solution comprising one of these salts as a final rinse after impregnation and cleaning is especially advantageous where the impregnated substrate is a porous metallic article since the residual salt simultaneously will accelerate cure of the composition near the surface and inhibit corrosion of the metallic article. The impregnant, however, must meet the same proviso as set forth above.

A still further aspect of the invention comprises an improved process for bonding a pair of substrates with an anaerobic adhesive formulation by applying the adhesive between the substrates and joining them until bonded, the improvement comprising first (determining whether either of the substrates has been treated with a composition leaving a residue of a nitrite, silicate, borate, or alkaline carbonate salt and if so, selecting an anaerobic adhesive for application to the substrates which is free of an acid having a pKa of 6 or lower.)

DETAILED DESCRIPTION OF THE INVENTION

All of the U.S. patents identified in the foregoing background section of the invention are incorporated herein by reference.

The (meth)acrylic ester employed in the compositions of the invention (i.e. component (a)) may be any (meth)acrylic ester provided, however, that if the ester compound also includes acid functionally having a pKa above 6, the formulation must include at least 1 ppm of a transition metal salt and the composition must be free of acyl hydrazine compounds of formula (1) above. Suitable monomers are described in U.S. Pat. Nos. 3,425,988, 4,018,851, 4,295,909, 4,309,526, 4,380,613 and 4,439,600, all of which are incorporated herein by reference.

One class of monomers suited for use in this invention comprises acrylate esters having the following general formula:

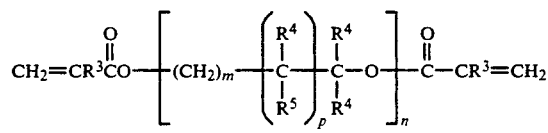

wherein $R^4$ represents a radical selected from the group consisting of hydrogen, halogen, alkyl of 1-4 carbon atoms, inclusive, hydroxy alkyl of 1-4 carbon atoms inclusive, and $$CH_2=CR^3\overset{\overset{O}{\|}}{C}O-$$

$R^3$ is a radical selected from the group consisting of hydrogen, halogen, and lower alkyl of 1-4 carbon atoms; $R^5$ is a radical selected from the group consisting of hydrogen, —OH and $$CH_2=CR^3\overset{\overset{O}{\|}}{C}O-$$

m is an integer equal to at least 1, e.g. from 1 to 8 or higher, for instance, from 1 to 4 inclusive, n is an integer equal to at least 1, for example, 1 to 20 or more; and p is 0 or 1.

The polymerizable polyacrylate esters utilized in accordance with the invention and corresponding to the above general formula are exemplified by, but not restricted to, the following materials: diethylene glycol dimethacrylate. triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate and trimethylol propane triacrylate. Of these, the preferred monomers are triethylene glycol dimethacrylate and polyethylene glycol dimethacrylate.

In addition to the monomers described above, epoxy acrylate monomers (i.e. the reaction products of epoxy compounds or prepolymers with acrylic or methacrylic acids) and urethane acrylate capped prepolymers such as those described in U.S. Pat. Nos. 4,309,526, 4,295,909, 4,018,851, 4,380,613, and 4,439,600 may be employed. Also useful are (meth)acrylic esters of ethoxylated bisphenol A and structurally similar compounds.

Although di-and and other poly(meth)acrylate esters are preferred, monoacrylate esters can be used, particularly if the non-acrylate portion of the ester contains a hydroxyl or amino group, or other reactive substituent which serves as a site for potential cross-linking. Examples of useful mono(meth)acrylate monomers are hydroxyethyl methacrylate, cyanoethyl acrylate, t-butylaminoethyl methacrylate, glycidyl methacrylate, dicyclopentadiene methacrylate, lauryl acrylate and lauryl methacrylate. Further details on useful monomers may be found in U.S. Pat. No. 4,287,330 at Col. 3, line 51–Col. 6, line 44.

Silicones having (meth)acrylate ester functionally are another class of monomers which may be used in the invention. Examples of such silicones may be found in U.S. Pat. Nos. 3,878,263, 4,035,355, 4,348,454, 4,477,326, 4,503,208, 4,504,629, 4,575,545, 4,575,546, 4,640,940, and 4,684,538, all incorporated herein by reference.

In order to enhance shelf life of the compositions, it may be desirable to remove metal ions, if present, from the polymerizable monomer. This may be particularly desirable in the event that commercially obtained monomers, which often contain significant amounts of metal ions are employed in these compositions. (Removal of metal ions may be effected by means known to those skilled in the art.)

The compositions of the invention may comprise a single type of polymerizable monomer or may comprise a blend of two or more different polymerizable monomers. (Preferably they are substantially 100% solids formulations, i.e. they cure to solids without substantial weight loss due to solvent volitalization, or the like.)

The preferred compositions include at least one monomer or prepolymer which is characterized by at least two acrylate or methacrylate groups per molecule. Such compounds are suitably used at levels of 30% or more by weight of the composition. The improved thermal properties of the inventive compositions are usually most striking when the formulation contains a urethane acrylate or urethane methacrylate capped prepolymer.

The compositions of the inventions cure via a peroxy initiated free radical mechanism. Useful initiators are any of a wide variety of known peroxy compounds. Illustrative of such initiators are the diacyl peroxides such as benzoyl peroxide; dialkyl peroxides such as di-t-butyl peroxide; ketone peroxides such as methylethyl ketone peroxides; peresters which readily hydrolyze, e.g., t-butyl peracetate, t-butylperbenzoate, di-t-butyldiperphthalate; and peroxycarbonates, i.e., reaction products of isocyantes and hydroperoxides. A particularly useful class of peroxy initiators are the organic hydroperoxides such as cumene hydroperoxide, methyl ethyl ketone hydroperoxide, t-butyl hydroperoxide, etc. Of these, cumene hydroperoxide is especially preferred. It is also known in the art to generate hydroperoxides in-situ by aeration of some (meth)acrylic ester monomers. The peroxy initiators should be used at a concentration of about 0.01% to about 10% by weight of the total formulation, preferably 0.1% to about 5% by weight, most preferably about 1%-3% by weight.

In the case of impregnants and other formulations to which transition metal salts are added, it is usually necessary to add the transition metal compound at the time the composition is to be used unless the composition is aerated to maintain stability.

As previously mentioned, the inventive compositions also include an accelerating salt selected from nitrite, borate, silicate and alkaline carbonate salts. Most preferred are the nitrite salts as they show the highest acceleration activity. The counter-ion is not considered critical. Suitably these salts are alkali metal salts such as sodium, potassium, or lithium salts. Such salts are commonly used in metal corrosion inhibition formulations. Other counter-ions, however, may be useful such as ammonium or copper salts.

The level of accelerating salt may be very low. For surface activation, levels of sodium nitrite based corrosion inhibitor providing just a few ppm nitrite ion on the surface can be sufficient to substantially improve the cure rate. When added to adhesive and sealant compositions, the level is generally recommended to be between 0.001 and 5.0 percent, preferably 0.01 and 1.0 percent, more preferably between 0.1 and 0.5 percent.

Other accelerators of anaerobic polymerization may also be advantageously included. Such accelerators include a variety of secondary and tertiary organic amines as well as sulfimides (e.g. benzoic sulfimide) which are also known in the art. These may be used at a concentration range of about 0.1 to about 5, preferably about 1 to about 2% by weight of the total composition. However, it has been found that certain combinations of accelerators have the opposite effect in the presence of the accelerating salt so that polymerization of the composition is severely inhibited. If compounds having a pKa of less than 6 are present in the formulation the presence of a nitrite, borate, silicate or alkaline carbonate salt in the formulation or on the substrate will usually substantially inhibit cure speed. The inhibition effect is magnified if the formulation includes both an acid having an pKa of 6 or less and a compound of the formula:

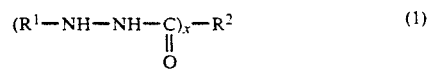

$$(R^1-NH-NH-\underset{\underset{O}{\|}}{C})_x-R^2 \qquad (1)$$

Without being bound thereto, the Applicant believes that this cure inhibition effect is the result of a side reaction in which the nitrite and acid together participate to decompose the peroxy compound to ionic species rather than to a radical capable of cure initiation. The presence of compounds (1) are believed to participate in a nitrite regeneration reaction which accounts for the more severe inhibition effect noted when both acid and a compound of formula (1) are present in the formulation.

An exception to the prohibition against acidic compounds in the formulation has been observed, however, in impregnation formulations to which a small amount of transition metal compound has been added in accordance with the usual procedure as noted above. Typically a small amount of Cu(II) and/or Fe(II) salt or complex compound are added to such formulations at the time of use. Aeration of the formulation is then maintained to prevent premature polymerization. It has been observed that addition of nitrite, borate, silicate or alkaline carbonate salts accelerates cure in the absence of acid. This acceleration is accentuated by the presence of small amounts of water. In addition to the acceleration in the absence of acid, a synergistic acceleration is obtained when relatively high levels of an acid such as acrylic acid are included in the formulation with a nitrite salt. In these formulations the acrylic acid alone has a noticeable inhibiting effect. The mechanism accounting for this phenomenon is not known although, again, it is believed that the mechanism probably involves competing reactions which respectively produce radicals or ions from the peroxy species. In any event, the use of such accelerating salts, especially the nitrite salts, as components of anaerobic impregnation formulations or in a final accelerator rinse, will give substantial acceleration even in the presence of an acid having a pKa of 6 or less.

Other agents such as thickeners, plasticizers, etc, are also known in the art and may advantageously be incorporated where functionally desirable, provided only that they do not interfere with the functioning of the composition for its intended purpose. This, of course, can be determined by simple experimentation.

The invention may be illustrated by the following non-limiting examples.

EXAMPLE 1

Model anaerobic formulations were prepared as in Table I. Cure rates of the respective formulations between a sodium chloride salt plate and a polished aluminum panel (having a trace content of copper) were monitored for two hours by real time FTIR and compared to the cure rate observed when the aluminum panel was treated by immersing it in a 5 wt % solution of aqueous sodium nitrite for 15 minutes and blow drying the panel with dry nitrogen immediately after removing it from the solution. The highest observed cure rate and percent cure after 2 hours for the respective formulations on untreated and treated panels are recorded in Table I below.

TABLE I

| Ingredients | Compositions (parts by wt.) | | | | | |
|---|---|---|---|---|---|---|
| | A | B | C | D | E | F |
| Triethylene glycol dimethacrylate | 92.1 | 92.1 | 92.1 | 92.1 | 92.1 | 92.1 |
| Cumene hydroperoxide | 2.2 | 2.2 | 2.2 | 2.2 | 2.2 | 2.2 |
| Saccharin | 0.8 | 0.8 | 0.8 | — | — | — |
| Acrylic acid | — | 4.3 | — | 4.3 | 4.3 | — |
| Acetyl phenyl hydrazine | 0.6 | 0.6 | — | 0.6 | — | — |
| % Cure 2 hrs untreated | 60 | 77 | 36 | 65 | 35 | 16 |
| % Cure 2 hrs NaNO₂ treated | 72 | 17 | 34 | 30 | 11 | 56 |
| Untreated-highest cure rate (moles/l-sec) | 0.10 | 0.27 | 0.21 | 0.08 | 0.02 | 0.02 |
| NaNO₂ treated-highest cure rate (moles/l-sec) | 0.62 | 0.02 | 0.11 | 0.01 | 0.01 | 0.16 |

The results show that nitrite treatment enhanced the cure of formulations A and F. Inhibition was observed with formulations B, D and E, all of which included acrylic acid and two of which also included acetyl phenyl hydrazine. It was also noted that for formulation A the induction period before onset of polymerization was reduced from 40 minutes on the untreated panel to 5 minutes on the treated panel.

EXAMPLE 2

The effect of silicate, borate, carbonate and nitrite salt compounds commonly used as corrosion inhibitors on a commercial anaerobic impregnation formulation (Locite ® RESINOL ™ RTC) was investigated by adding salt or salt/water mixtures as shown in Table II to the commercial aerated formulation containing several ppm copper (II). Oxygen bubbling was maintained and samples taken at 1 hour and 48 hours after addition of the additive to the formulation. Gel times (40° C.) of the samples were determined and are shown in Table II. The results demonstrate that all of the additives gave acceleration relative to the control with the water/NaNO₂ combination giving the best acceleration.

TABLE II

| ADDITIVE | AMOUNT (%) | 40° C. GEL (MIN) | |
|---|---|---|---|
| | | 1 HR | 48 HRS |
| None | — | 32 | 25 |
| NaNO₂ | 0.5 | 7 | 6.5 |
| NaNO₂ | 0.5 | 2 | — |
| H₂O | 0.1 | | |
| Na₂SiO₃ | 0.5 | 16 | 15 |
| Na₂SiO₃ | 0.5 | 11 | 15 |
| H₂O | 0.5 | | |
| Na₂B₄O₇ | 0.5 | 11 | 9.5 |
| Na₂B₄O₇ | 0.5 | | |
| H₂O | 0.1 | 16 | 11 |
| Na₂CO₃ | 0.5 | 11 | 14 |
| Na₂CO₃ | 0.5 | | |
| H₂O | 0.1 | 6 | 14 |

EXAMPLE III

A typical anaerobic impregnant formulation was prepared containing the following ingredients:

| 71.4% | Triethylene glycol dimethacrylate |
|---|---|
| 15.0% | Lauryl methacrylate |
| 7.5% | Hydroxyl propyl methacrylate |
| 5.0% | Dye |
| 0.51% | p-benzoquinone |
| 0.30% | Benzoic sulfimide |
| 0.25% | t-Butyl hydroperoxide |
| >0.1% | Chelators and stabilizers |

Several ppm of copper (II) salt was added together with the acrylic acid and/or sodium nitrite additives as shown in Table III. Oxygen was bubbled through the respective formulations and samples tested for 40° C. gel times after 1 hour and 24 hour aging periods. The results, given in Table III demonstrate that in this system acrylic acid alone had an inhibiting effect whereas the nitrite alone gave substantial acceleration which was not significantly affected when combined with small amounts of acrylic acid. At higher levels of acrylic acid, a synergistic acceleration was observed.

TABLE III

| ADDITIVE | AMOUNT (%) | 40° C. GEL (MIN) | |
|---|---|---|---|
| | | 1 HR | 24 HRS |
| None | — | 20.2 | 21.4 |
| NaNO₂ | 0.1 | 11.8 | 6.2 |
| NaNO₂ | 0.5 | 7.0 | 6.5 |
| Acrylic Acid (AA) | 0.5 | 20.5 | 18.5 |
| AA | 1.0 | 24.6 | 25.0 |
| AA | 5.0 | — | 48 |
| NaNO₂ | 0.5 | 8.1 | 7.0 |
| AA | 0.5 | | |
| NaNO₂ | 1.0 | 8.6 | 8.0 |
| AA | 1.0 | | |
| NaNO₂ | 5.0 | 4.9 | 4.3 |
| AA | 1.0 | | |
| NaNO₂ | 5.0 | 1.9 | — |
| AA | 4.0 | | |

What is claimed is:

1. A substantially 100% solids curable formulation comprising:
   (a) at least one (meth)acrylic ester;
   (b) a polymerization initiating effective amount of a peroxy compound; and
   (c) an effective amount for accelerating polymerization of a nitrite, borate, silicate or alkaline carbonate salt,
provided that if the formulation includes an acid having a pKa of 6 or less, the formulation further includes at least 1 ppm of a transition metal salt and is free of compounds of the formula:

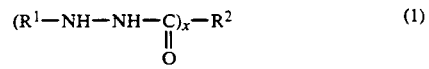

$$(R^1-NH-NH-\underset{\underset{O}{\parallel}}{C})_x-R^2 \qquad (1)$$

where $R^1$ is a monovalent hydrocarbon group, x is an integer of at least 1 and $R^2$ is H or a x-valent hydrocarbon group.

2. A formulation as in claim 1 wherein the (meth)acrylic ester comprises at least two (meth)acrylic groups.

3. A formulation as in claim 1 wherein the transition metal salt is a salt of copper, iron or mixtures thereof.

4. A formulation as in claim 1 adapted to be anaerobically curable.

5. A formulation as in claim 1 wherein the peroxy compound is a hydroperoxide or perester.

6. A formulation as in claim 4 wherein the formulation is adapted for impregnation into a porous substrate.

7. A formulation as in claim 1 wherein the ingredient (c) is a nitrite salt.

8. A formulation as in claim 7 wherein the nitrite salt is a nitrite salt of an alkali metal.

9. A formulation as in claim 1 wherein the ingredient (c) is present in an amount between 0.001% and 5.0%.

10. A formulation as in claim 1 further comprising between about 0.1% and 5% of a sulfimide accelerator.

11. A formulation as in claim 1 which is substantially free of an acid having a pKa of 6 or less.

* * * * *